United States Patent

[11] 3,612,952

[72] Inventor John E. Hagberg
Mountain Lakes, N.J.

[21] Appl. No. 51,097
[22] Filed June 30, 1970
[45] Patented Oct. 12, 1971
[73] Assignee Westinghouse Electric Corporation
Pittsburgh, Pa.

[54] TIME DELAY SIGNAL DEVICE ESPECIALLY FOR PHASE COMPARISON PROTECTIVE RELAYING SYSTEM

4 Claims, 1 Drawing Fig.

[52] U.S. Cl. .......... 317/27 R, 317/36 TD
[51] Int. Cl. .......... H02h 3/28, H02h 7/26
[50] Field of Search .......... 317/36, 27, 28, 39; 307/293, 294

[56] References Cited

UNITED STATES PATENTS

| | | | |
|---|---|---|---|
| 3,295,019 | 12/1966 | Altfather .......... | 317/39 (X) |
| 3,470,418 | 9/1969 | Hagberg .......... | 317/27 |

*Primary Examiner*—Lee T. Hix
*Assistant Examiner*—Harvey Fendelman
*Attorneys*—A. T. Stratton, C. L. Freedman and John L. Stoughton

ABSTRACT: A phase comparison relaying network which permits the delaying of the local signal which responds to the alternating current at the local terminal of the alternating current transmission line for an interval which may be greater than the time interval of 180° of the alternating current whereby to compensate for time delay in the transmission from the remote terminal of the alternating current transmission line to the local terminal a signal responsive to the alternating current at the remote terminal when the time of transmission is greater than the 180° interval.

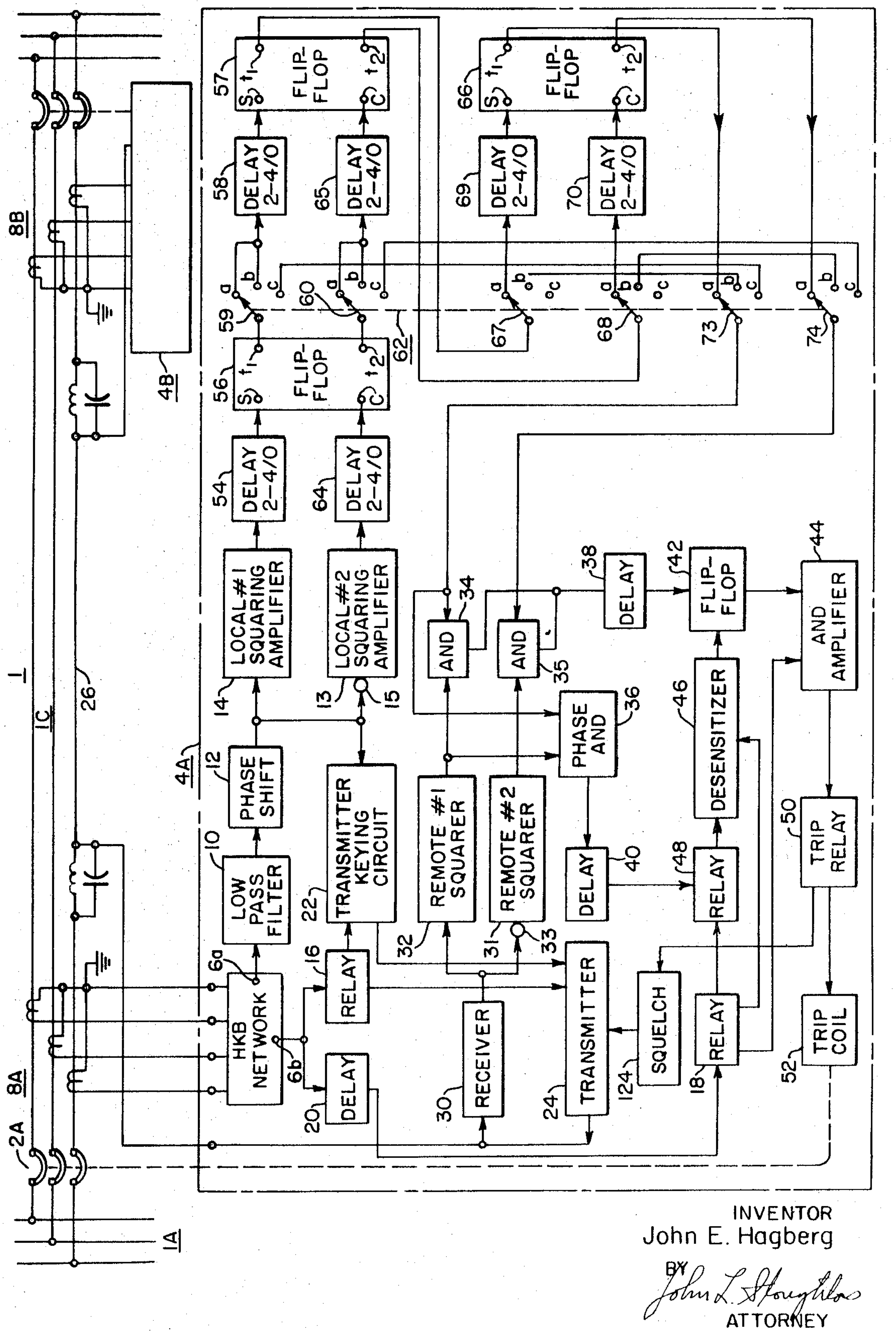
INVENTOR
John E. Hagberg
BY John L. Stoughton
ATTORNEY

TIME DELAY SIGNAL DEVICE ESPECIALLY FOR PHASE COMPARISON PROTECTIVE RELAYING SYSTEM

BRIEF SUMMARY OF THE INVENTION

In many instances where a signal is supplied from the remote to the local station for comparison with a signal derived at the local location it becomes necessary to provide a time delay in the circuit conducting the local signal to properly phase the local signal with the remote signal caused by the time delay in the transmission of the signal from the remote to the local station. This delay has particular applicability in a phase comparison relaying system which compares at the local terminal the phase of the current at the remote terminal of the alternating current transmission line to determine the location of the fault.

When the communication channel between the terminals has a time interval approaching or greater than the half cycle or 180° interval of the alternating power in the transmission line, a mere delay network cannot be used because the energization of the delay network would be terminated prior to the timing out of the delay network and with no output signal there would be no signal at the local station or terminal for comparison with the signal received over the communication channel from the remote terminal. In accordance with the present invention at least two delay networks separated by an actuating network (which may take the form of a flip-flop) is utilized. The delay in the first delay network, which may approach the half cycle interval of the alternating power, upon timing out actuates the actuating network or flip-flop. When so actuated the network remains actuated for at least a period equal to an interval equal to 180° of the alternating power. The energization of the flip-flop initiates an operation of the second delay network which delay network is added to that of the first network. The delay of each network is not greater than the 180° interval, but the sum thereof may equal a delay substantially in excess of the half cycle of 180° interval of the alternating power. As many actuating or flip-flop networks and delays as may be necessary to compensate for the transmission delay may be connected in series to give the desired timing interval.

BRIEF DESCRIPTION OF THE DRAWINGS

The drawing illustrates, in block form, a phase comparison relaying network embodying the invention.

DETAILED DESCRIPTION

Referring to the drawings by characters of reference the numeral 1 designates an alternating potential power transmission circuit which interconnects a first bus arrangement 1A with a second bus arrangement 1B through the contacts 2A and 2B of a suitable interrupting device, not further shown. The contacts 2A are opened in response to the energization of a trip coil 52 by a trip relay 50 in response to a fault in the circuit 1 between the busses 1A and 1B. The relaying networks 4A and 4B are identical and only one thereof is shown in detail. The description of the network 4A will therefore be applicable to network 4B.

The local terminal relaying network for 4A includes a suitable network 6 energized by the current flowing in the transmission line 1 by means of the customary transformer array 8A and in the usual manner, provides a single-phase alternating quantity at its output terminal *6a* and a direct current quantity at its output terminal *6b* . The alternating quantity which is a weighed quantity comprising positive, negative and zero sequence components of the current in the line passes through a low pass filter 10, a phase shift network 12, and local squaring amplifiers 13 and 14. Under some conditions it may be desirable to omit the filter 10 and network 12. The squaring amplifier 13 is provided with a NOT input 15 so that the amplifiers 13 and 14 will be actuated in 180° phase relation with respect to each other.

The direct current output terminal *6b* of the network 6 energizes a first relay 16 and a second relay 18 through a delay network 20. The relay 16 always operates prior to the operation of the relay 18. The relay 16, when actuated, renders effective a transmitter keying circuit 22 and permits the transmitter 24 to be operated by the transmitter keying circuit in accordance with an alternating quantity output of the network 6.

The output of the transmitter 24 is connected to and supplies a controlled carrier signal to the conductor 26 of the network 1. This signal is transmitted over the conductor 26 to receivers of the relaying network 4B located at the remote station. The network 4B is energized by the transformer array 8B and includes a transmitter which transmits a signal over the line 26 to the receiver 30 of the network 4A which receiver is tuned to receive the carrier signal supplied by the transmitter embodied in the network 4B. In some instances it is contemplated that the transmitters in the networks 4A and 4B transmit on the same frequency and in other instances at different frequencies depending upon considerations well known to those skilled in the art. If the transmitter frequency is of constant frequency an on-off type of system may be used whereby the transmitters conduct at opposite half cycles so that when the current flows into the line at one end thereof and out of the other end thereof as in the case of an external fault one or the other of the transmitters will always be transmitting. In the case of an internal fault both transmitters will transmit together. In other cases instead of an on-off system a shift in frequency could be embodied.

The output of the receiver 30 is connected to a pair of remote squaring amplifier networks 31 and 32. The squaring amplifier network 31 is provided with a NOT input 33 whereby the squaring amplifier 31 will be actuated (in the case of an on-off transmission) when no signal is being received by the receiver 30 and the squaring amplifier 32 will be actuated when the receiver provides an output in response to the reception thereof of a carrier wave of the remote terminal transmitter.

The output terminal of the remote squaring amplifier 32 is connected to one input terminal of an AND network 34 and to the output terminal of the remote squaring amplifier 31 is connected to one input circuit of the AND network 35. A phase AND network 36 is connected in parallel with the AND network 34 which, as will be described below, resensitizes the desensitizer 46 through the delay network 40 in the event of an internal fault occurring subsequent to an external fault.

The output of the terminals of the AND circuit 34 and 35 are both connected to the input terminal of a delaying network 38.

The output of the local squaring amplifier 14 is connected to actuate a flip-flop 56 through a delay network 54. The $t_1$ terminal of the flip-flop 56 is energized as a consequence of the timing out of the delay network 54 and is connected to the terminal S of the flip-flop 57 through a delay network 58 which like the flip-flop 56 is actuated as a consequence of the timing out of the network 58 to energize its terminal $t$ . Similarly, the output terminal of the local squaring amplifier 13 is connected to the terminal C of the flip-flop 62 through a delay network 64 to reset the flip-flop 62 with its output terminal $t_2$ energized and terminal $t_1$ deenergized as a consequence of the timing out of the delay network 64. Also this terminal $t_2$ is connected to the input terminal C of the flip-flop 57 through a relay network 65 to reset the flip-flop 57 upon the timing out of the delay network 65. More specifically, the output terminals $t_1$ and $t_2$ of the flip-flop 56 are connected to the arms 59 and 60 of a six-pole triple-throw switch 62. The *a* and *b* contacts associated with the switch arm 59 are connected together and to the input terminal of a delay network 64 and the *a* and *b* contacts associated with the switch arm 60 are connected to the input terminal of the delay network 65. The output terminals of the $t_1$ and $t_2$ flip-flop 57 are connected to switch arms 67 and 68 respectively of the switch 62. The terminals *a*associated with the switch arms 67 and 68 are respectively connected to the input terminals S and C of the flip-flop 66 through a pair of delay networks 69 and 70. The output terminals $t_1$ and $t_2$ of the flip-flop 66 are connected to contact *a* of the switch arms 73 and 74 respectively of the switch 62. The arms 73 and 74 are connected to the second input terminals of the AND networks 34 and 35 respectively. With the switch 62 in the *a* position, the flip-flops 56, 57 and 66 are sequentially actuated to supply the second input terminals of the AND networks 34 and 35 with square waves of an electrical quantity which are phase shifted, lagging, with respect to the square waves supplied by the local squaring amplifier by an amount determined by the sum of the timing of the delays 54, 58 and 59 and of the delays 54, 65 and 70.

The contacts *b* associated with the switch arms 67 and 73 are connected together as are the contacts *b* associated with the switch arms 68 and 74 so that with the switch 62 in its *b* position the delay networks 69 and 70 are not used. Similarly, the contacts *c* associated with the switch arms 59 and 73 and the contacts *c* associated with the arms 60 and 74 are connected together so that with the switch 62 in its *c* position the delay networks 58 and 65 as well as the delay networks 69 and 70 are not used.

When the input signals applied to either or both of the AND networks 34, 35 are of proper phase relation with respect to each other (in phase) the delay network 38 is actuated. After the delay network times out a signal is applied to the flip-flop 42 which, assuming it has been sensitized by the operation of the desensitizer of 46 due to closure of the relay 18 will provide an output signal to the AND amplifier of 44. The relay 18 also sensitized the AND amplifier so that the signal from the output of the flip-flop 42 energizes the trip relay 50 which energizes the trip relay coil 52 to open the breaker contacts 2A. The trip relay 50 also operates a squelch network 124 for terminating transmission by the transmitter 24 after operation of the trip relay 50 and trip coil 52.

In the event that the fault which actuated the relays 16 and 18 was external to the line 1, the signals applied to the AND networks 34 and 35 would not actuate the delay 38. If this condition existed for the timing interval of the timer 48, the timer 48 will operate the desensitizer and prevent transients which might occur due to switching or otherwise from flipping the flip-flop 42 and falsely tripping the breaker contacts 2A.

In the event that subsequent to the remote fault and the timing out of the timer 48, an internal fault should occur, the phase AND network 36 would be actuated to cause the delay network 40 to time out. When delay 40 times out it will actuate the desensitizer 46 to sensitize the flip-flop 42. Since at this time the AND networks 34 and 35 have caused the delay 38 to time out the flip-flop 42 will flip and the contacts 2A will open.

Further details with respect to the general operation of the phase comparison relaying network embodying the devices 4A and 4B may be found in U.S. Pat. No. 3,295,019 dated Dec. 27, 1966 to C. T. Altfather which is incorporated herein by reference. The major difference between this embodiment and the embodiment of the said Altfather patent lies in the timing network which connects the local squaring amplifiers and the AND networks 34 and 35 by which a delay greater than the time interval of a one-half cycle of the alternating power in the line 1 may be obtained to provide a greater delay compensation for a delay in the transmission of the signal at the remote location to the output of the remote squares 31 and 32.

This disclosure also distinguishes from the said Altfather patent in that a second local squaring amplifier 13, a second remote squaring amplifier 31 whereby a phase comparison each half cycle of the alternating power of the network 1. This feature is disclosed and claimed in U.S. Letters Pat. No. 3,470,418 dated Sept. 30, 1969 and granted to Herbert W. Lensner and myself.

When an internal fault occurs in the transmission line 1, the relay 16 closes first and establishes the operation of the transmitter 24 in both of the networks 4A and 4B. Subsequently both relays 18 operate. The receivers 30 receive the on-off transmission from the transmitters 24 in the opposite networks 4B and 4A. The output of the receiver is squared in the squarers 31 and 32 and applied to the first input terminals of the AND networks 34 and 35. The time required for the transmitter at the network 4B to supply the signal through the receiver 30 and squarers 31 and 32 to the AND networks 34 and 35 is greater than the time required for the local squaring amplifiers 13 and 14 to energize the second input terminals of the AND networks 34 and 35. The time for the remote signal to energize the first input terminals of the AND networks 34 and 35 may well be in excess of 8 milliseconds (assuming the protected power line to be of 60Hz.). For example, assume a delay of 12 milliseconds. In this event each of the time delays 54, 58, 69 connected between the local amplifier 13 and AND network 35 and each of the time delays 64, 65 and 70 connected between the local amplifier 14 and the AND network 34 will be set to time out in 4 milliseconds.

The flip-flop 56 will be flipped by the timing out of the delays 54 and 64 to establish a first series of square half waves which lag the initiating series of square half waves from the amplifiers by 4 milliseconds. Similarly the flip-flop 57 will be actuated by the delays 58 and 65 to provide a second series of half waves which lag the first series by 4 milliseconds and the flip-flop 66 will be actuated by the delays 69 and 70 to provide a third series of half waves which lag the second series by 4 milliseconds.

It will be appreciated that the third series of half waves lag the initiating series of half waves by 12 milliseconds and (assuming an internal fault as described) the half waves of the third series will be in phase with the half wave of the remote squarers 31 and 32. This will permit the delay 38 to time out and an opening of the contacts 2A will occur.

If the fault was external, the square half waves at the two input terminals of the AND networks 34 and 35 would be 180° out of phase and the timing out of the delay 38 to open the contacts 2A would not occur.

What is claimed and is desired to be secured by United States Letters Patent is as follows:

1. A relaying system for comparing the phase of an alternating electrical quantity at first and second spaced locations, first and second sensing networks, first means connecting said first network to respond to said quantity at said first location, second means connecting said second network to respond to said quantity at said second location, a plurality of timing devices, the timing interval of each of said timing devices being less than the interval of a half cycle of said electrical quantity, a bistable means having first and second stable conditions, third means connecting said first network to said bistable means and including first of said timing devices, said third means being effective to initiate a said timing interval of said first timing device and to place said bistable means in its said first condition at fixed intervals relative to the alternation of said quantity, said first timing device being effective at the end of its timing interval to place said bistable means in its said second condition, a first comparing network for comparing the relative phase of two input signals, fourth means connecting said bistable means to said comparing network and including a second of said timing devices, said bistable means being effective upon being placed in its said second condition to initiate a timing interval in said second timing device, said second timing device being effective as a consequence of its completion of its said timing interval to provide a first of said two input signals to said comparing network, a transmitting device at said second location, fifth means connecting said transmitting device to said second network, said transmitting device being effective to transmit a signal indicative of the phase of said electrical quantity as detected by said second network, a receiving means at said first location having an output circuit, said receiving means being effective to receive said signal transmitted by said transmitting device and to energize its said output circuit with a second quantity of constant phase with respect to said transmitted signal, sixth means connecting said output circuit to said comparing network and effective to supply the second of said two input signals thereto, and an output device connected to said comparing network and energized thereby at predetermined relationships of said two input signals, the total time of said timing intervals of said first and second timing devices being a fixed proportion of the total time for the transmission of the phase signal of said electrical quantity from said second location to said comparing network whereby said comparing network is effective to provide said predetermined relationships of the phase of said quantity at said first and second locations.

2. The combination of claim 1 in which said transmitter signal is of a first character solely during a given half cycle of said alternating quantity at said second locations, said receiving means is effective to supply said second input signal solely when said signal of said first character is being received by said receiver.

3. The combination of claim 2 in which said first network provides a first signal portion solely during a selected half cycle of said alternating quantity at said first location, said third means includes a third of said timing device, said third timing device being effective to place said bistable means in its said second condition as a consequence of the timing out thereof of its said timing interval, said third means is effective to initiate said timing interval of said first timing device upon the occurrence of said first signal portion and of said third timing device upon the termination of said first signal portion, said fourth means includes a fourth of said timing devices, a second comparing network is provided, said second comparing network comparing the relative phase of two input signals, said fourth timing device being effective as a consequence of its completion of said timing interval to provide one of said two input signals of said second comparing network, a seventh means connecting said output circuit of said receiving means to said second comparing network and effective to supply the other of said two input signals of said second comparing network, said output device being connected to said second comparing device and energized thereby at predetermined relationships of said one and said other input signals of said second comparing network.

4. The combination of claim 3 in which the output of said first network is an alternating potential quantity and said first signal portion is a half cycle thereof of one polarity, said third means is effective to initiate the timing out of said timing interval of said third timer as a consequence of the existence of a second signal portion of said alternating potential quantity output of said first network, said transmitter being ineffective to transmit a signal at the opposite half cycle to said given half cycle of said alternating quantity at said second location, each of said comparing networks effective in the absence of one of its said two input signals to actuate said output device.